US009133351B2

(12) United States Patent
Kasperchik et al.

(10) Patent No.: US 9,133,351 B2
(45) Date of Patent: Sep. 15, 2015

(54) NEUTRAL GRAY REFLECTIVE INK

(71) Applicant: Hewlett-Packard Development Company, LP, Houston, TX (US)

(72) Inventors: Vladek Kasperchik, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 13/720,918

(22) Filed: Dec. 19, 2012

(65) Prior Publication Data

US 2014/0170384 A1    Jun. 19, 2014

(51) Int. Cl.
| | |
|---|---|
| *B44C 5/04* | (2006.01) |
| *C09D 10/00* | (2006.01) |
| *C09B 67/00* | (2006.01) |
| *C09D 11/00* | (2014.01) |
| *C09D 7/12* | (2006.01) |
| *C09D 1/00* | (2006.01) |

(52) U.S. Cl.
CPC ............... *C09D 7/1216* (2013.01); *C09D 1/00* (2013.01); *C09D 7/1266* (2013.01); *C09D 7/1275* (2013.01); *Y10T 428/24413* (2015.01)

(58) Field of Classification Search
CPC ........ B42D 15/00; C09D 11/30; C09D 11/00; C09D 11/34; Y10T 428/24413
USPC .................. 428/148, 411.1, 106; 283/72, 82; 106/31.33, 31.28; 8/637.1; 523/160
See application file for complete search history.

(56) References Cited

U.S. PATENT DOCUMENTS

| | | | |
|---|---|---|---|
| 3,809,568 | A | 1/1972 | Askew |
| 5,043,741 | A * | 8/1991 | Spehrley, Jr. .................... 347/88 |
| 6,655,797 | B2 | 12/2003 | Smith et al. |
| 6,936,316 | B2 | 8/2005 | Nigam et al. |
| 7,387,669 | B2 | 6/2008 | Mronga et al. |
| 7,691,196 | B2 | 4/2010 | Pfaff et al. |
| 8,070,186 | B2 | 12/2011 | Einhorn et al. |
| 8,192,010 | B2 | 6/2012 | Edwards et al. |
| 2003/0039808 | A1* | 2/2003 | Ichinose et al. ............... 428/195 |
| 2006/0042509 | A1* | 3/2006 | Henglein et al. .............. 106/415 |
| 2006/0192183 | A1 | 8/2006 | Klyszcz et al. |
| 2007/0281136 | A1* | 12/2007 | Hampden-Smith et al. .......................... 428/195.1 |
| 2007/0292692 | A1* | 12/2007 | Yue et al. .................... 428/411.1 |
| 2008/0210122 | A1* | 9/2008 | Magdassi et al. .......... 106/31.05 |
| 2009/0214833 | A1 | 8/2009 | Oyanagi et al. |
| 2010/0140916 | A1* | 6/2010 | Firth et al. ....................... 283/82 |
| 2010/0288161 | A1* | 11/2010 | Ruud ......................... 106/31.48 |
| 2011/0303885 | A1 | 12/2011 | Vanheusden et al. |
| 2012/0098248 | A1* | 4/2012 | Kasperchik et al. ............ 283/72 |

FOREIGN PATENT DOCUMENTS

| | | |
|---|---|---|
| EP | 1621359 | 2/2006 |
| JP | 58152072 | 9/1983 |
| WO | 2010028285 | 3/2010 |

* cited by examiner

*Primary Examiner* — Maria Veronica Ewald
*Assistant Examiner* — Travis Figg
(74) *Attorney, Agent, or Firm* — Thorpe, North & Western

(57) ABSTRACT

The present disclosure is drawn to an inks, printed articles, and related methods. In one example, the a neutral gray reflective ink can include an aqueous liquid vehicle, iron oxide reflective particles having an average particle size from 3 nm to 180 nm dispersed in the aqueous liquid vehicle, and a dye system solvated in the aqueous liquid vehicle. The iron oxide particles and the dye system are present at relative concentrations to provide a reflective ink that is neutral gray.

20 Claims, 3 Drawing Sheets

NEUTRAL GRAY REFLECTIVE INK

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. More specifically, current inkjet printing technology involves forcing the ink drops through small nozzles by thermal ejection, piezoelectric pressure, or oscillation, onto the surface of a media.

As expanded colors and appearances are sought for home or office decorative printing, as well as for commercial package printing, etc., developments have been made to provide inkjet prints and printed articles with specific features related to the use of specialty inks. However, printed articles with such specific features are noticeably limited among current available options. Accordingly, investigations continue into developing inks and/or printed articles that exhibit specific properties.

BRIEF DESCRIPTION OF THE DRAWING

The drawings illustrate various embodiments of the present disclosure and are part of the present specification.

DETAILED DESCRIPTION

Figure 1:
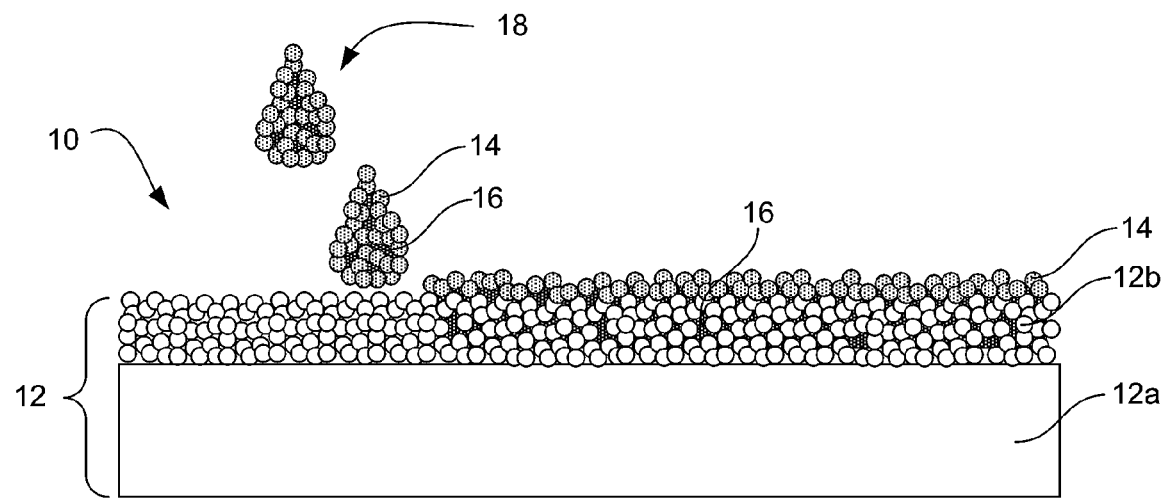
FIG. 1 is a schematic cross-sectional view of a printed article being prepared using an inkjet ink of the present disclosure.

The present disclosure is drawn to neutral gray reflective inks, printed articles with a reflective appearance, and methods of forming printed articles with a reflective appearance. In accordance with this, a neutral gray reflective ink can comprise an aqueous liquid vehicle, iron oxide reflective particles having an average particle size from 3 nm to 180 nm dispersed in the aqueous liquid vehicle, and a dye system solvated in the aqueous liquid vehicle. The iron oxide particles and the dye system can be present at relative concentrations to provide a reflective ink that is neutral gray. For example, the neutral gray reflective ink can have an a* value of 2 to −3 and a b* value from 4 to −15 when printed on neutral white media substrate, e.g., neutral white having an L* value of 90 to 100 and an a*b* value within the ranges set forth for the neutral gray reflective ink. In one example, the ink can be formulated to have a silver metallic sheen when printed on a porous media substrate having an average pore size that is smaller than the average particle size of the iron oxide reflective particles. Furthermore, the pores are typically also large enough in volume to receive a portion of the dye system beneath the iron oxide reflective particles. Thus, an essentially two layered printed article can be printed with a single ink, and the resultant image printed with the ink can have silver metallic appearance with specular reflectivity of at least twice that of an unprinted surface of the porous media substrate, and in some cases, at least four times or more greater than the unprinted surface. When this same ink is printed on plain paper or other similar media with very large pores, the silver metallic sheen can be less noticeable, but the image printed using this same ink is still neutral gray in appearance.

In another example, a printed article with metallic appearance can comprise a porous media substrate, a dye system printed on the porous media substrate, and iron oxide particles also printed on the porous media substrate. The porous media substrate can comprise a supporting base and a porous coating layer, the porous coating having an average pore size and a pore volume. The dye system can be received by at least a portion of the pore volume, and the iron oxide particles can be printed coincident with the dye system to provide the metallic shiny appearance. The iron oxide particles can have an average particle size that is greater than the average pore size of the porous coating, causing the iron oxide particles to be primarily present at an outermost surface of the porous coating. In one example, the iron oxide particles can have an average size from 3 nm to 180 nm, and the average pore size of the porous coating layer is from 2 nm to 150 nm. It is noted that when referring to an average "pore size," what is generally meant is the average size or diameter of pore openings at the surface of the porous media substrate. "Pore volume," on the other hand, refers to the total volume within the pores that is collectively available to receive ink liquids, e.g., liquid vehicle components, solvated dyes, etc. Within these pores, the dyes can be received beneath the outermost surface where the iron oxide particles primarily reside. In more specific detail regarding the iron oxide particles and their coverage on the porous media substrate, it is noted that in one example, the iron oxide coverage in the range of 3 µg/cm² to 80 µg/cm². Furthermore, the specular reflectivity of the printed regions can be at least two times, four times, or even greater than four times that of the unprinted portion of the porous coating layer.

In another example, a method for forming a printed article with a reflective appearance can comprise inkjet printing a neutral gray reflective ink onto a porous media substrate. The neutral gray reflective ink can comprise an aqueous liquid vehicle, iron oxide reflective particles having an average particle size from 3 nm to 180 nm dispersed in the aqueous liquid vehicle, and a dye system solvated in the aqueous liquid vehicle. The porous media substrate can comprise a supporting base and a porous coating layer having an average pore size opening and a pore volume. The average pore size can be smaller than the average particle size of the iron oxide reflective particles. Also, the iron oxide reflective particles can remain at least substantially at an outermost surface of the porous media substrate and at least a portion of dye system can be received within pore volume beneath the outermost surface.

It is noted that in this and other related examples, the reflective ink does not contain true metallic (elemental) particles, but rather produces a layer with metallic appearance or reflectivity that simulates a metal layer on the print surface. In other words, the present disclosure is drawn to inks that provide a spot color for digital prints with color-neutral "metallic silver" appearance when printed on microporous substrates. This is unique in that the ink provides a silver, neutral appearance, but does not contain any silver or any other elemental metals that may have undesirable or questionable environmental impact. Thus, elemental silver particles are not used to generate the neutral gray reflective (silver) inks of the present disclosure. In fact, the compound that is used to generate the metallic appearance is not even silver in appearance alone. The active metallic particles that are used, as mentioned briefly, are iron oxide (magnetite) nanoparticles. These particles, though highly reflective, actually have an inherent yellow-orange hue. The yellow-orange hue can be essentially neutralized to a neutral gray (metallic silver) appearance by a balanced addition of the dye system described herein. The dye system typically provides a blueish hue. However, the dye system does not need to include blue dyes per se, but alternatively can be a mixture of dyes that provide a generally blueish hue that balances out the yellow-orange hue of the iron oxide particles. For example, the dye system can comprise one or more dye(s), such as a single blue dye, a mixture of a cyan and magenta dyes, or any other dye combination that can be combined to provide the general blueish hue that is effective in neutralizing the yellow-orange hue of the iron oxide particles, thus generating a more neutral gray appearance. In one specific example, the dye system can be provided, as mentioned, by cyan dye or dyes and magenta dye or dyes, thereby "neutralizing" yellow-orange appearance of the ink. When a mixture of dyes is used, the dye content can be adjusted so that their mix has an optical absorbance spectrum complimentary to that of iron oxide dispersion present in the ink.

In further detail, the neutralization of the yellow-orange tint inherent to magnetite iron oxide pigments can be achieved by mixing colorants having visible absorbance in a spectral range complimentary to that of the iron oxide. Thus, the magnetite dispersions used (predominant absorbance in blue and partially green part of the visible spectrum) can be balanced out using dyes having predominant absorbance in the red, yellow and (to lesser extent) green part of the visible spectrum. Thus, in order to "equalize" a reflectance print spectrum and produce color-neutral silver-gray luster, reds and greens should be absorbed by the dye system until a balanced neutral gray reflective ink is formulated, e.g., blue dyes, cyan and magenta dyes, etc. work well for this.

Turning now to specific structural and compositional components of the present disclosure, various details are provided regarding the porous media substrate as well as the inks deposited thereon. In accordance with this, the neutral gray reflective inks of the present disclosure can be printed on a wide variety of substrates with a neutral gray appearance. However, one advantage of the inks of the present disclosure is that when printed on certain porous media substrates, the printed image can have a silvery sheen resulting from a combination of the iron oxide particles present on a top surface of the porous media substrate, and the dye system received there beneath within the pores of the porous media substrate.

Examples of printable media that can be used include various coated types of paper, but works particularly well on porous coated media substrates with average pore size of less than about 180 nm, and more particularly ranging from about 2 nm to 150 nm. That being said, porous media substrates with larger pore sizes can also be used, but will not typically have as much sheen as porous media substrates with pore sizes smaller than the average size of the iron oxide particles in the ink. Furthermore, additional coatings can be applied to porous media substrates (either by ink jet ink or by more traditional analog coating methods) to reduce the size of the pores for a given porous media substrate to improve the sheen of the inks of the present disclosure. Thus, when referring to the "porous coating layer" of the porous media substrate, what is typically meant is the outermost porous coating layer that receives (and primarily stops) substantial penetration of the iron oxide particles into the pores of the porous coating layer. If there are multiple porous coating layers, the dye system can be received in the pores of one or more of such layers, but in order to retain the metallic sheen of the image, the iron oxide particles typically remain substantially at the surface of the outermost coating layer. That being stated, even when the desire is to generate a metallic sheen, some penetration of the iron oxide particles into the pores can still be acceptable, depending on the degree of metallic sheen desired.

In further detail regarding the porous media substrate, when coated with a printable porous coating, the porous media substrate can comprise both a supporting base and a porous coating layer. Suitable supporting base material that can be used includes paper, plastic, cardboard, etc., providing a bottom substrate layer suitable for a porous coating layer. Thus, applied to the supporting base is the porous coating layer, and together the supporting base and the porous coating layer form a recording material that can be well adapted for use with an inkjet printing device. As mentioned, the porous coating layer can be coated directly on the supporting base, or can be coated thereon with intermediate layers of similar or other compositions.

The supporting base and the porous coating layer may take the form of a sheet, a web, or a three-dimensional object of various shapes. Likewise, the supporting base can be of any type and size and can be any material that will be able to provide a mechanical support to the above-mentioned layers. In some examples, the supporting base can be a flexible film or a paper-based substrate, including both rigid and flexible substrates. The supporting base can also be selected from cellulosic or synthetic paper (coated or uncoated), cardboard, polymeric film (e.g. plastic sheet like PET, polycarbonate, polyethylene, polypropylene), fabric, cloth, and other textiles. The bottom substrate layer may also be a single material plastic film made from PET, polyimide, or another suitable polymer film with adequate mechanical properties. In some examples, the supporting base can include any substrate that is suitable for use in digital color imaging devices, such as electrophotographic and/or inkjet imaging devices, including, but in no way limiting to, resin coated papers (so-called photobase papers), regular papers, overhead projector plastics, coated papers, fabrics, art papers (e.g. water color paper), plastic film of any kind, and the like. In further detail, the supporting base can be paper (non-limitative examples of which include plain copy paper or papers having recycled fibers therein) or photopaper (non-limitative examples of which include polyethylene or polypropylene extruded on one or both sides of paper), and/or combinations thereof. In yet some other examples, the supporting base can be a photobase. Photobase is a coated photographic paper, which includes a paper base extruded on one or both sides with polymers, such as polyethylene and polypropylene. Photobase support can include a photobase material including a highly sized paper extruded with a layer of polyethylene on both sides. In this regard, the photobase support can be an opaque water-resistant material exhibiting qualities of silver halide paper. The photobase support can include a polyethylene layer having a thickness of 10 to 24 grams per square meter (gsm or $g/m^2$). The photobase support can also be made of transparent or opaque photographic material.

As mentioned, coated on the supporting base is the porous coating layer described above. Typically, this layer is pre-coated on the supporting base by an analog process, i.e.

non-digital process, using coating technology such as Meyer rod coating, curtain coating, knife coating, roller coating, spray coating, slot die coating, etc. With the porous coating layer present on the porous media substrate, the layer can have an average pore diameter that is either larger or smaller than the diameter (average size) of iron oxide particles used to print thereon. However, a greater metallic sheen can typically be realized when the average pore size of the porous media substrate is smaller than the average particle size of the iron oxide particles. As mentioned, if the pores are too large, the iron oxide particles will not stay up on the surface as well as when the pores are smaller, and the printed image will typically have a grayer and less of a metallic silver appearance. However, if desired, an additional coating can be applied to reduce the size of the pores further, making the new coating the "porous coating layer."

The printed article, depending on the porous media substrate chosen for printing, can be useful for forming articles that have, for examples, decorative applications, such as greeting cards, scrapbooks, brochures, signboards, wall paper, business cards, certificates, packaging, and other similar applications.

Turning now to the neutral gray reflective ink per se, these reflective inks can be prepared to generate a metallic luster that provides high metallic reflectivity, and optionally other high print quality characteristics, e.g., enhanced print edge definition, optical density, etc. Furthermore, the inks can be prepared to generate a neutral gray appearance as well as a metallic silver sheen. For example, the printed articles prepared as described herein can have an optical reflectivity of a metal foil, or more commonly, at least a shiny metallic appearance. Thus, the printed article can exhibit a sparkling appearance from reflected light and can have the tendency to reflect at a specular angle when exposed to a directional light source. By "metallic appearance" or "metallic luster," what is meant herein is that the printed article has an opaque or a semi-opaque appearance and reflects the light as a metal reflects light, i.e. shows strong directional reflectivity of incident light. Thus, printed articles said to have a metallic luster or appearance include printed images having some characteristic of metal that can exhibit high gloss (greater than 200 gloss units) or sheen.

In certain examples, inks and methods can be used to prepare printed articles having printed features with a metallic appearance as defined by specular reflectivity of that superior to or, at least equal, to 10%. This means that a printed layer is able to reflect light at an angle of incidence of 20 degrees at least at 10% of the incident light intensity. In another example, the printed layer is able to reflect light at the specular angle at least at 15% or even at least 25% of the incident light intensity. Without being bound by any theory, it is believed that the human perception of "metallic" is related to ability of an observer to catch specular light reflection of directional light source coming off an object surface. Thus, a smooth surface begins to looks metallic if it is able to reflect at a specular angle more than, approximately, 10% of the incident light intensity (highly polished surface of true metals can reflect up to 85 or 90% of incident visible light). The higher is the intensity of the reflected light at a specular angle (combined with low reflection off specular angle), the more metallic the appearance of the object surface. That being described, in obtaining the metallic appearance, in one example, the printed feature can comprise uniform metal oxide particle coverage in the range of 3 µg/cm$^2$ to 80 µg/cm$^2$.

In further detail regarding the measurement of specular reflectivity and the increase in specular increase that can be achieved in accordance with examples of the present disclosure, it is noted that a comparison between the porous media substrate surface and the ink layer(s) with iron oxide particles contained therein can be conducted to determine the increase in specular reflectivity. Essentially, in one example, an inkjet paper, such as HP Advanced Photo Paper (having a surface pore size of about 10 to 35 nm) can be used to evaluate the specular reflectivity at a 20 degree angle of incidence using directional light. Next, the porous media substrate can be printed with the neutral gray inks of the present disclosure at about 50 to 75 pL/300$^{th}$ pixel (for the particular inks containing about ~2.0 wt. % of iron oxide). Inks with higher iron oxide content may be printed at a lower ink flux density while inks with lower iron oxide content may be printed at a higher ink flux density. That being stated, typical iron oxide coatings produced can be in the range 14 µg/cm$^2$ to 20 µg/cm$^2$ in one example, and the specular reflectivity of the ink can likewise be determined using directional light at a 20 degree angle of incidence. In this example, the specular reflectivity can be said to have a two-fold (2×) increase if the total specular reflectivity is increased by 100%. As a reference, the specular reflectivity of glossy photo paper is typically not higher than 1.5 to 2.0% at 20° angle. In other examples, the specular reflectivity can be increased four-fold (4×), eight-fold (8×), or twelve-fold (12×), compared to the porous media substrate.

The reflective ink composition used to form the metallic sheen or luster, as mentioned, forms an essentially uniform coating with strong sparkling and metallic reflective appearance, e.g., a metallic luster. As mentioned, the iron oxide can have a yellow-orange hue, and this can be neutralized to have a neutral gray reflective appearance by using a dye system described herein or other similar dye system. It is noted that the yellow-orange hue of magnetite is specifically described for exemplary purposes. Other iron oxides can likewise be used that have a slightly different hue, and thus, different dyes or dye mixtures can be included in the various inks to balance out the specific type and concentration of iron oxide selected for use in accordance with examples of the present disclosure. Thus, the term "iron oxide" includes any chemical compounds composed of iron and oxygen, including iron oxides, iron hydroxides, and oxide/hydroxides. Examples of iron oxides that can be included in the inks of the present disclosure are iron (II) oxide (wüstite, FeO), iron (II,III) oxide (magnetite, $Fe_3O_4$) and iron (III) oxide (hematite, $Fe_2O_3$). Examples of iron hydroxides include iron (II) hydroxide ($Fe(OH)_2$) and iron (III) hydroxide ($Fe(OH)_3$) and oxihydroxide FeO(OH). To the extent that these iron oxide particles can be neutralized with dye systems to generate a neutral gray ink with a metallic silver appearance, they can be used and balanced with any appropriate dye combination. Without being bound by any theory, it is believed that magnetite ($Fe_3O_4$) and hematite ($Fe_2O_3$) are oxidatively stable in aqueous environment; however, wüstite (FeO) is oxidatively unstable and can readily revert to $Fe_2O_3$ or $Fe_3O_4$. In one specific example, when the metal oxide is provided by $Fe_3O_4$ iron oxide particles, the printed article exhibits a gold-like (yellow-orange) appearance that can be neutralized by various blue hue dye systems to generate a neutral gray ink with a metallic silver appearance. By "metallic silver" appearance or sheen, what is meant is that the printed article has a visual appearance of a silver-plated surface and has the color of metallic silver (Ag). Thus, the printed article approximates the gloss, sheen, and color of a silver object. Thus, the ink composition forms a uniform coating with strong metallic reflective appearance, which can have a metallic luster and silver appearance, even when no elemental silver particles are used in the ink formulation.

As mentioned and in further detail, the reflective ink can also include a colloidal dispersion of the iron oxide particles. The average particle size of the metal oxide particles can be in the range of 3 nm to 180 nm. In some examples, the average particle size of iron oxides is in the range of 5 nm to 150 nm and, in some other examples, in the range can be from 10 nm to 100 nm. Particle sizes outside of this range can be used, but for inkjet ink applications, these ranges are particularly practical. Furthermore, the iron oxide particles, such as $Fe_3O_4$, can be present in the neutral gray reflective ink at from 0.1 wt % to 15 wt % of the total weight of the ink composition. In some examples, the iron oxide particles can be present in an amount ranging from 0.2 wt % to 12 wt %. In some other examples, the iron oxide particles are present in an amount ranging from 0.5 wt % to 6 wt % of the total weight of the ink composition.

The iron oxide particles can be dispersed with dispersants, though this is not always the case. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains. In some examples, the dispersant used to disperse iron oxide particles, such as $Fe_3O_4$, is a polyether alkoxysilane dispersant.

Examples of polyether alkoxysilane dispersants used to dispersed iron oxide particles can be represented by the following general Formula (I):

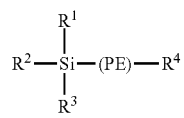

(I)

where $R^1$, $R^2$ and $R^3$ are independently hydroxy groups or linear or branched alkoxy groups. In some examples, $R^1$, $R^2$ and $R^3$ are linear alkoxy groups having from 1 to 5 carbon atoms. In some other examples, $R^1$, $R^2$ and $R^3$ groups can independently or alternatively be —$OCH_3$ or —$OC_2H_5$. PE is a polyether oligomer chain segment of the structural formula $[(CH_2)_n$—$CH(R)$—$O]_m$, wherein n is an integer ranging from 0 to 3, and m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2$—$CH_2$—O—), or polypropylene glycol (PPG) chain segment (—$CH_2$—$CH(CH_3)$—O—), or a mixture of both types. In some other examples, the polyether chain segment (PE) contains PEG units (—$CH_2CH_2$—O—). $R^4$ can be independently hydrogen, or a linear or a branched alkyl group. In some examples, $R^4$ is an alkyl group having from 1 to 5 carbon atoms.

Some other examples of polyether alkoxysilane dispersants used to dispersed iron oxide particles can be represented by the following general Formula (II):

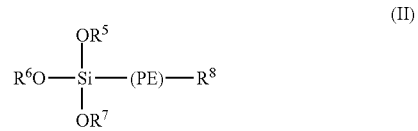

(II)

where $R^5$, $R^6$, and $R^7$ are independently hydrogen, linear alkyl groups, or branched alkyl groups. In some examples, $R^5$, $R^6$, and $R^7$ are independently linear alkyl groups having from 1 to 5 carbon atoms in chain length, and in other examples $R^5$, $R^6$, and $R^7$ are independently —$CH_3$ or —$C_2H_5$. $R^8$ can be independently hydrogen, or a linear or a branched alkyl group. In some examples, $R^8$ is an alkyl group having from 1 to 5 carbon atoms.

Yet some other examples of polyether alkoxysilane dispersants used to dispersed iron oxide particles can be represented by the following general Formula (III):

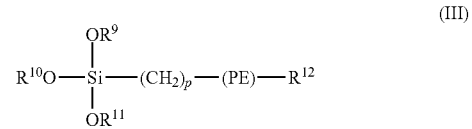

(III)

where $R^9$, $R^{10}$, and $R^{11}$ are the same as $R^5$, $R^6$, and $R^7$, respectively, of Formula (II) above, $(CH_2)_p$ is a linking group, where p is an integer ranging from 3 to 8, $R^{12}$ is the same as $R^8$ of Formula (II) and $R^4$ of Formula (I), and PE is the same as PE of Formulas (I) and (II).

Examples of suitable polyether alkoxysilanes that can be used include $(CH_3O)_3Si$—$(CH_2CH_2O)_m$—H, $(CH_3CH_2O)_3Si$—$(CH_2CH_2O)_m$—$H_3$, $(CH_3O)_3Si$—$(CH_2CH_2O)_m$—$CH_3$, $(CH_3CH_2O)_3Si$—$(CH_2CH_2O)_m$—$CH_3$, $(CH_3O)_3Si$—$(CH_2CH_2O)_m$—$CH_2CH_3$, $(CH_3CH_2O)_3Si$—$(CH_2CH_2O)_m$—$CH_2CH_3$, $(CH_3O)_3Si$—$(CH_2CH(CH_3)O)_m$—$H_3$, $(CH_3CH_2O)_3Si$—$(CH_2CH(CH_3)O)_m$—H, $(CH_3O)_3Si$—$(CH_2CH(CH_3)O)_m$—$CH_3$, and $(CH_3CH_2O)_3Si$—$(CH_2CH(CH_3)O)_m$—$CH_3$. Some other specific examples of polyether alkoxysilanes that may be used for the reactive dispersant molecules include $HO(CH_2CH_2O)_m$—$(CH_2)_3$—$Si(OCH_3)_3$, $HO(CH_2CH_2O)_m$—$(CH_2)_3$—$Si(OCH_2CH_3)_3$, $CH_3O(CH_2CH_2O)_m$—$(CH_2)_3$—$Si(OCH_3)_3$, $CH_3O(CH_2CH_2O)_m$—$(CH_2)_3$—$Si(OCH_2CH_3)_3$, $C_2H_5O(CH_2CH_2O)_m$—$(CH_2)_3$—$Si(OCH_3)_3$, $C_2H_5O(CH_2CH_2O)_m$—$(CH_2)_3$—$Si(OCH_2CH_3)_3$, $HO(CH_2CH(CH_3)O)_m$—$(CH_2)_3$—$Si(OCH_3)_3$, $HO(CH_2CH(CH_3)O)_m$—$(CH_2)_3$—$Si(OCH_2CH_3)_3$, $CH_3O(CH_2CH(CH_3)O)_m$—$(CH_2)_3$—$Si(OCH_3)_3$, and $CH_3O(CH_2CH(CH_3)O)_m$—$(CH_2)_3$—$Si(OCH_2CH_3)_3$. In any of the previous examples, the variable m is an integer equal to 2 or greater. In some examples, m is an integer ranging from 2 to 30 and, in some other examples, m is an integer ranging from 5 to 15.

Commercial examples of the polyether alkoxysilane dispersants include, but are not limited to, Silquest®A-1230 manufactured by Momentive Performance Materials, and Dynasylan® 4144 manufactured by Evonik/Degussa.

The amount of dispersant used in the ink may vary from 1 wt % to 300 wt % based on the iron oxide particle content. In some examples, the dispersant content range can be from 2 wt % to 150 wt % of the metal oxide particle content. In still other examples, the dispersant content range is from 5 wt % to 100 wt % of the metal oxide particle content. In still other examples, the ink composition is based on fine particles of iron oxide particles, such as $Fe_3O_4$, in an aqueous ink vehicle, and the dispersion of particles can be prepared via milling or dispersing the metal oxide powder in water in the presence of suitable dispersants.

As an example, a magnetite ($Fe_3O_4$) pigment dispersion is used to describe principles of the present disclosure. However, other iron oxide pigment dispersions can also be prepared similarly. In this example, an $Fe_3O_4$ pigment dispersion may be prepared by milling commercially available inorganic oxide pigment having large particle size (in the micron range) in the presence of the dispersants described above until the desired particle size is achieved. The starting dispersion to be milled is an aqueous dispersion with solid content up to 40 wt % of the iron oxide pigment. The milling equipment that can be used is a bead mill, which is a wet grinding machine capable of using very fine beads having diameters of less than 1.0 mm as the grinding medium, for example, Ultra-Apex Bead Mills from Kotobuki Industries Co. Ltd. The milling duration, rotor speed and temperature may be adjusted as known to those skilled in the art to achieve the results desired. The pH of the ink may be in the range of pH 3 to pH 11. In some examples, the pH of the ink can be from pH 5 to pH 9 and, in some other examples, from pH 5.5 to pH 9. The pH of the ink composition may be adjusted by addition of organic or inorganic acids or bases, i.e. pH adjusting agent, but this is not required. The ink composition can have a viscosity within the range of 1 cps to 10 cps, or within the range of 1 cps to 7 cps, as measured at 25° C. Once the particles are prepared for inclusion in the ink, other dyes, such as a blue dye system (blue dye, mixture of magenta and cyan dye, etc.), is co-formulated with the iron oxide particles to form a neutral gray ink that can impart a metallic silver sheen when printed on a porous media substrate.

Thus, in this and other examples, the dye system can be present at a concentration to contribute to the neutral gray appearance, while the iron oxide particles continue to provide the sheen to the printed image. In one example, the neutral gray reflective ink can have an a* value of 2 to −3 and a b* value from 4 to −15 when printed on neutral white media substrate. In a more specific example, the a* value can be from 1.5 to −2, and the b* value can be from 4 to −4. In accordance with this, these neutral gray values can be obtained when printing the ink at a single flux within the range of 40 pL/300$^{th}$ pixel to about 95 pL/300$^{th}$ pixel. In a more specific example, these neutral gray values can be obtained when printing the ink at all ink fluxes within the range of 50 pL/300$^{th}$ pixel to about 75 pL/300$^{th}$ pixel. These neutral gray values can be obtained, particularly when the ink contains about 1 to 3 wt % of iron oxide, or about 2 wt % iron oxide, but can also be obtained at other iron oxide concentrations in some examples.

The inks described herein can be traditional inks used for analog printing or inkjet inks used for digital printing, and typically include a liquid vehicle along with the colorants (dyes and iron oxide particles) previously described. Thus, as used herein, "liquid vehicle" is defined to include any liquid composition that is used to carry the iron oxide particles and dyes to the substrate. A wide variety of liquid vehicle components may be used therein, including a mixture of a variety of different agents, including without limitation, surfactants, co-solvents, buffers, biocides, viscosity modifiers, and water. In some examples, the liquid vehicle is an inkjet liquid vehicle. Typical liquid vehicle formulations described herein include water, and can further include co-solvents present in total at from 0.1 wt % to 50 wt %, depending on the jetting architecture, though concentrations outside of this range can also be used. For example, the total amount of co-solvent may range from 0.1 wt % to 30 wt % of the ink composition, or can be from 8 wt % to 25 wt % of the ink composition. The water can make up the a large portion of the liquid vehicle, and in some examples, may be present in an amount representing from 20 wt % to 90 wt %, or may be present in an amount representing from 30 wt % to 80 wt % of the total composition. Further, non-ionic, cationic, and/or anionic surfactants can be present, ranging from 0.01 wt % to 10 wt %. The balance of the formulation can be any other vehicle component known in the art, such as biocides, viscosity modifiers, materials for pH adjustment, sequestering agents, preservatives, and the like.

Examples of suitable classes of organic solvents include polar solvents, such as amides, esters, ketones, lactones, and ethers. In additional detail, co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, N-methylpyrrolidone (NMP), dimethyl sulfoxide, sulfolane, glycol ethers, alkyldiols such as 1,2-hexanediol, ethoxylated glycerols such as LEG-1, etc.

In addition to water and the other liquid vehicle components, various types of agents may be present in the ink composition to provide certain properties to the ink compositions for specific applications. The various ink compositions may also include, for example, any number of buffering agents and/or biocides. Examples of suitable biocides include, but are not limited to, benzoate salts, sorbate salts, commercial products such as Nuosept® (ISP), Ucarcide® (Dow), Vancide® (RT Vanderbilt Co.) and Proxel® (Avecia), Kordek® MLX (Rohm and Haas), and other known biocides. Such biocides may be contained in amount representing less than 5 wt % of the ink composition. Surfactants can also be used and may include water-soluble surfactants, such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In some examples, fluorosurfactants or ethoxylated surfactants can be used as surfactants. In some other examples, ethoxylated silicone based surfactants are used. If used, the surfactant can be present at from 0.001 wt % to 10 wt % and, in some examples, can be present at from 0.001 wt % to 0.1 wt % of the ink compositions. The ink compositions may also include different types of polymer for enhancing rub or scratch durability of printed feature, or to provide binding properties.

Turning now to the FIGS., FIG. 1 sets forth schematic cross-sectional image related to method of preparing printed articles 10. In this example, a porous media substrate 12 is prepared by coating a supporting base 12a (paper or other supporting base material described herein above in greater detail) with a porous coating layer 12b. In this example, there is only one porous coating layer applied to a single side of the support base. However, it is noted that any of a number of coating layers can be used, e.g., one to each side, multiple coatings on each side, symmetrical or asymmetrical coating(s) on either side, etc. Thus, the porous coating layer shown in this example should be considered for purposes of the present disclosure to show the outermost porous coating layer.

Suitable materials that can be used to form the porous coating layer 12b include inorganic pigments and a polymeric binder. The inorganic pigments can include metal oxides and/or semi-metal oxides particles, such as those independently selected from silica, alumina, boehmite, silicates (such as aluminum silicate, magnesium silicate, and the like), titania, zirconia, calcium carbonate, clays, or combinations thereof. In some examples, the inorganic pigments particles are modified or unmodified fumed silica. If silica is used, it can be selected from the group of commercially available fumed silica: Cab-O-Sil® LM-150, Cab-O-Sil® M-5, Cab-O-Sil® MS-55, Cab-O-Sil® MS-75D, Cab-O-Sil® H-5, Cab-O-Sil® HS-5, Cab-O-Sil® H-5, Aerosil® 150, Aerosil® 200, Aerosil® 300, Aerosil® 350, and/or Aerosil® 400. In some examples, the inorganic pigment can be fumed silica or fumed alumina aggregates as primary particles. In other examples, the inorganic particulate pigments can be modified or unmodified alumina. The alumina coating can comprise pseudo-boehmite. Commercially available alumina particles can be used, including, but not limited to, Sasol Disperal® HP10, Disperal®HP14, boehmite, Cabot Cab-O-Sperse® PG003 and/or CabotSpectrAl® 81 fumed alumina. In one example, the inorganic pigment particles can be from 30 nm to 300 nm in size, and optionally, can have Brunauer-Emmett-Teller (BET) surface area from 100 to 400 square meters per gram. Though any inorganic pigment aggregate size can be used, pigments or aggregates having an average particle size ranging from 100 nm to 250 nm can be particularly useful if the goal is to keep the size of the pores to a relatively small size. Appropriate coating methods that are typically used to apply the porous coating layer include Meyer rod coating, curtain coating, knife coating, roller coating, spray coating, slot die coating, etc., for example.

In further detail regarding FIG. 1, ink droplet 18 is shown which is used to print an image on the porous coating layer 12b. Specifically, the ink droplet and the image formed therefrom includes both iron oxide particles 14 and a dye system 16 that is included to neutralize the color of the iron oxide particle to form a neutral gray image with a metallic silver sheen. As can be seen in this FIG., the iron oxide particles remain primarily on an outermost surface of the porous coating layer, and the dye system (along with other liquids in the liquid vehicle) primarily fills voids between inorganic pigments of the porous coating layer.

Figure 2:
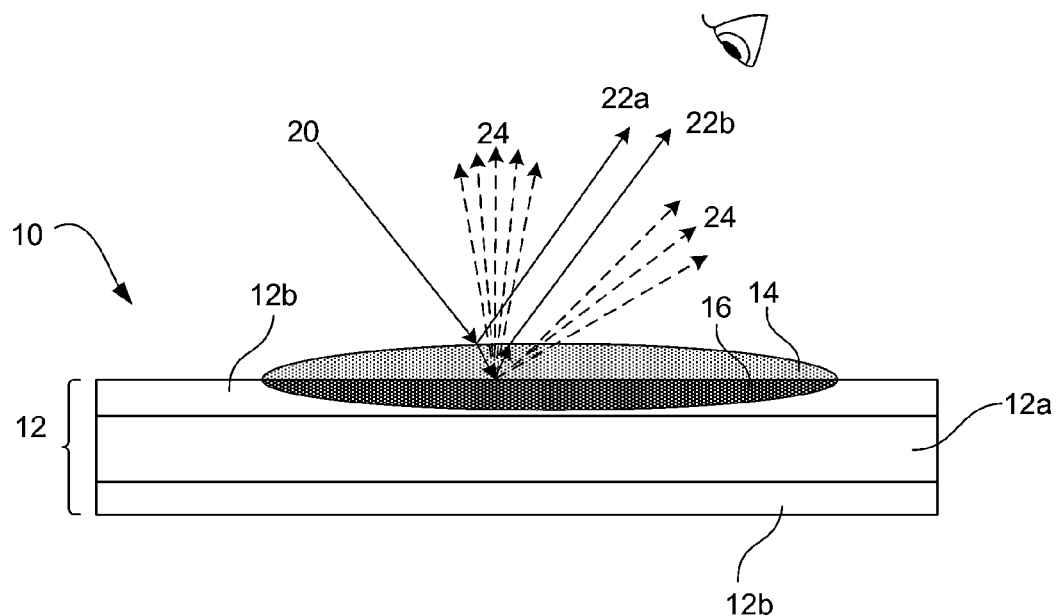
FIG. 2 is a schematic cross-sectional view of a printed article, and related reflective properties of the printed article, prepared in accordance with examples of the present disclosure.

FIG. 2 depicts a printed article 10 in accordance with an example of the present disclosure where the neutral gray reflective ink 14,16 is applied to the porous coating layer 12a of the porous media substrate 12 and forms essentially two layers, e.g., a iron oxide particle layer 14 and a neutralizing dye system layer 16. These two "layers" are not completely discrete, as both come from a common ink formulation. However, if the porous coating layer on the support base 12a has a pore size that is generally smaller than the particle size of the iron oxide particles. Thus, the particles and the dye system can separate to some degree, as shown. In this arrangement, the color-correcting function of the neutralizing dye system can be explained by the interaction of light with the various layers. Specifically, when the ink containing iron oxide nanoparticles is jetted onto microporous substrate, for example, it forms a thin and uniform reflective layer of iron oxide particles on the print surface. The iron oxide "film" is semi-transparent, so though a portion of the incident light 20 is reflected 22a, another portion passes therethrough and is reflected 22b from the neutralizing dye system layer. Thus, some of the light acquires the yellow-orange tint (metallic) of the print and another portion acquires a blue tint. The neutralizing dye system present in the liquid phase (prior to drying) that is absorbed into media porosity resides just under semi-transparent reflective layer of the iron oxide. Because absorbance spectrum of the dye system is formulated to be complimentary to that of the iron oxide particles residing at the surface, the hue of the reflected light passing through the oxide layer is corrected back to neutral, resulting in silver metallic appearance of the print. Additionally, it is noted that some of the reflected light is diffused 24 as well.

Figure 3:
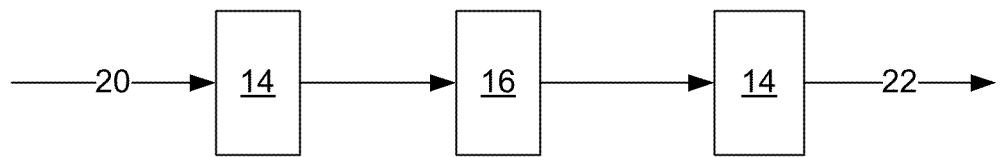
FIG. 3 is a schematic diagram showing the path of a portion of incident light and reflected light as acted upon by an iron oxide layer and dye neutralization layer.

FIG. 3 provides a schematic diagram describing just a portion of the incident light 20 that results in reflected light 22 that has a neutral gray appearance with a metallic silver sheen. Essentially, the reflected light from a metallic inkjet print is generated from a printed article with an iron oxide layer 14 at the surface of the porous media substrate, and a neutralizing dye layer 16 therebeneath. The incident light passes through the iron oxide layer, reflects from the neutralizing dye layer, and passed back through the iron oxide layer with a resultant appearance of a neutral gray image with a metallic silver sheen.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

When referring to "color space" or "color characteristics" the perceived color quality of an ink or printed image, this can be characterized using the CIELAB color space system. With this system, a color is defined using three terms L*, a*, and b*. L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). It is noted that when discussing the neutrality of the neutral gray reflective inks and printed images thereof, ink flux values are given rather than L* values because of the unique characteristics of the metallic sheen of the inks of the present disclosure. However, with respect to the porous media substrate, L* values are provided where applicable.

As used herein, "ink" includes compositions that comprise a liquid vehicle and colorant. In accordance with examples of the present disclosure, the inks can include at least one dye colorant and iron oxide particles as a second colorant, resulting in specific inks that can be used to print neutral gray reflective images as described herein.

As used herein, "dye" refers to the individual compound, complex, or molecule that imparts at least some color (or color correction) to an ink, including dyes that affect the overall color of an ink, but which are not themselves the predominant color. For example, a cyan and magenta dye can be used in combination not to impart these respective perceptible colors, but to balance out other colorants to provide an alternative perceptible color.

As used herein, "plurality" refers to more than one. For example, a plurality of dyes refers to at least two dyes.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the present inks, printed articles, and methods that are presently known. However, it is to be understood that the following are only exemplary or illustrative of the application of the principles of the present disclosure. Numerous modifications and alternative inks, printed articles, and methods may be devised by those skilled in the art without departing from the spirit and scope of the present compositions and methods. The appended claims are intended to cover such modifications and arrangements. Thus, while the present inks, printed articles, and methods have been described above with particularity, the following examples provide further detail in connection with what are presently deemed to be acceptable embodiments Example 1

Optical Absorbance Spectrum

The optical absorbance spectrum was evaluated for three colored fluids by placing each fluid in a 0.01 mm cuvette and measuring each fluid over an absorbance wavelength range from 400 nm to 700 nm. The equipment used was a Cary 50 Bio UV-Visible Spectrophotometer. Specifically, the three fluids tested comprised an aqueous vehicle containing the ingredients shown in Table 1, as follows:

TABLE 1

| Aqueous vehicle | |
| --- | --- |
| Ingredient | Wt % |
| LEG-1 (from Liponic) | 5 |
| 2-Pyrrolidinone | 9 |
| Proxel ® GXL | 0.1 |
| Surfynol ® 465 | 0.2 |
| Joncryl 683 resin (potassium salt) | 0.1 |
| Water | Balance |

To these aqueous vehicles were added various "colorants," as follows:

(a) an iron oxide dispersion (gold) at a concentration corresponding to 2 wt % of magnetite in the total ink formulation.

(b) a blue complimentary dye system with:
(i) 0.675 wt % AR-52 Magenta dye solution (Abs.(1:10 K) at 565 nm=1.353),
(ii) 3.25 wt % ProJet Cyan C854 dye solution (Abs.(1:10 K) at 619 nm=0.487), and
(iii) 1.5 wt % ProJet Magenta 700 dye solution (Abs.(1:5K) at 503 nm=0.554).

(c) a neutral gray/silver fluid dispersion comprising the 2 wt % magnetite of fluid (a) and the complimentary dye system of fluid (b).

Figure 4:
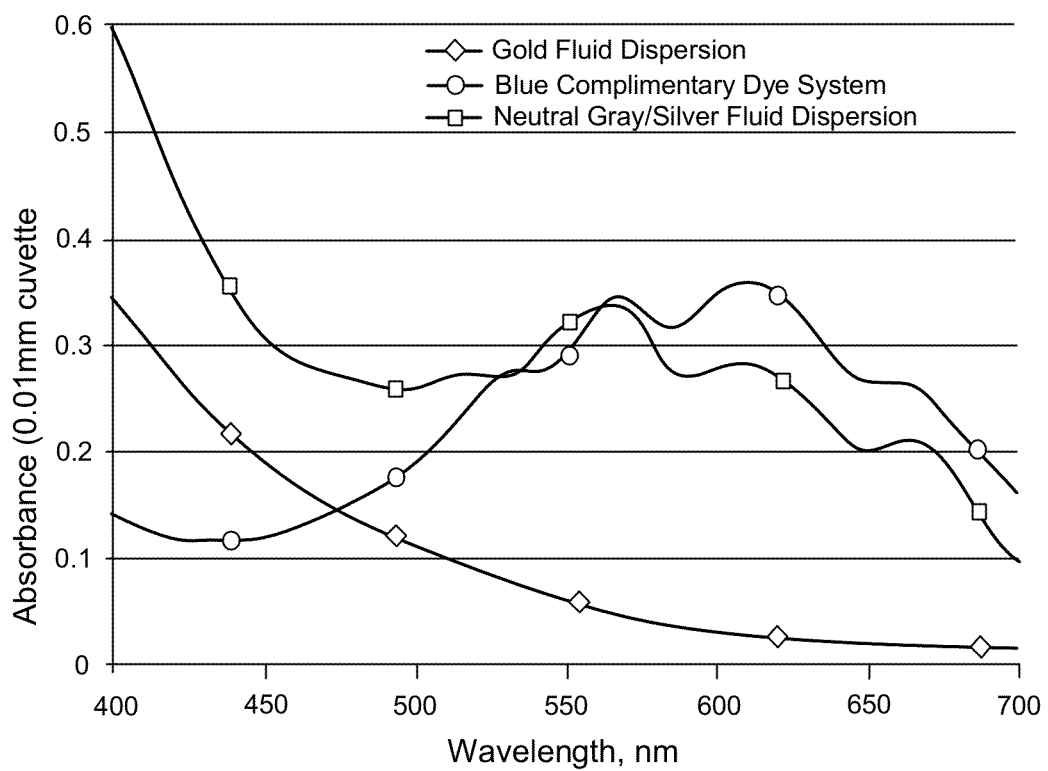
FIG. 4 is a graph setting forth the optical absorbance spectrum of three fluids for comparison purposes.

The results of the optical absorbance test are provided in FIG. 4. As can be seen, by combining the dye system of fluid (b) with the magnetite particles of fluid (a), the optical spectrum shifts to generate a neutral gray ink.

Example 2

Neutral Gray Reflective Ink

A dispersions of iron oxide particles was prepared by milling $Fe_3O_4$ powder (available from "Inframat Advanced Materials") in a "Kotobuki" Ultra-Apex Bead Mill (UAM-015) with a dispersant at a dispersant to pigment weight ratio of about 0.5. The milling dispersant used was Silquest®A-1230 (available from "Momentive Performance Materials"). The resulting $Fe_3O_4$ dispersion contained 5.6 wt % iron oxide ($Fe_3O_4$) and the average particle size of $Fe_3O_4$ was about 30 nm (as measured by "Nanotrac" particle size analyzer). The dispersion was then formulated into an inkjet ink formulation, as set forth below in Table 2, as follows:

TABLE 2

| Neutral Gray Reflective Ink (Magnetite "Silver" Ink Formulation) | |
| --- | --- |
| Ingredient | Wt % |
| $Fe_3O_4$ Dispersion (5.6 wt % iron oxide) | 36.2 |
| LEG-1 (from Liponic) | 5 |
| 2-Pyrrolidinone | 9 |
| Proxel ® GXL | 0.1 |
| Surfynol ® 465 | 0.2 |
| Joncryl 683 resin (potassium salt) | 0.1 |
| AR-52 Magenta dye solution (Abs.(1:10K) at 565 nm = 1.353) | 0.675 |
| ProJet Cyan C854 dye solution (Abs.(1:10K) at 619 nm = 0.487) | 3.25 |
| ProJet Magenta 700 dye solution (Abs.(1:5K) at 503 nm = 0.554) | 1.5 |
| Water | balance |

Example 3

Comparative Gold Reflective Ink

A dispersions of iron oxide particles was prepared by milling $Fe_3O_4$ powder (available from "Inframat Advanced Materials") in a "Kotobuki" Ultra-Apex Bead Mill (UAM-015) with a dispersant at a dispersant to pigment weight ratio of about 0.5. The milling dispersant used was Silquest®A-1230 (available from "Momentive Performance Materials"). The resulting $Fe_3O_4$ dispersion contained 5.6 wt % iron oxide ($Fe_3O_4$) and the average particle size of $Fe_3O_4$ was about 30 nm (as measured by "Nanotrac" particle size analyzer). The dispersion was then formulated into an inkjet ink formulation, as set forth below in Table 3, as follows:

TABLE 3

Gold Reflective Ink (Magnetite "Gold" Ink Formulation)

| Ingredient | Wt % |
|---|---|
| Fe$_3$O$_4$ Dispersion (5.6 wt % iron oxide) | 36.2 |
| LEG-1 (from Liponic) | 5 |
| 2-Pyrrolidinone | 9 |
| Proxel ® GXL | 0.1 |
| Surfynol ® 465 | 0.2 |
| Joncryl 683 resin (potassium salt) | 0.1 |
| Water | Balance |

Example 4

Comparative Elemental True Silver Ink

A metallic silver nanoparticle based ink formulation was prepared in accordance with Table 4, as follows:

TABLE 4

Elemental True Silver Ink (Silver Nanoparticle Ink Formulation)

| Ingredient | Wt % |
|---|---|
| Metallic silver nanoparticles (Mv = 25-40 nm) | 2 |
| Tetraethylene Glycol | 9 |
| Tergitol-15-S-7 | 1 |
| Surfynol 465 | 0.5 |
| Water | balance |

Example 5

Hue Neutralization of Gold Reflective Ink Compared to True Silver Ink

Figure 5:
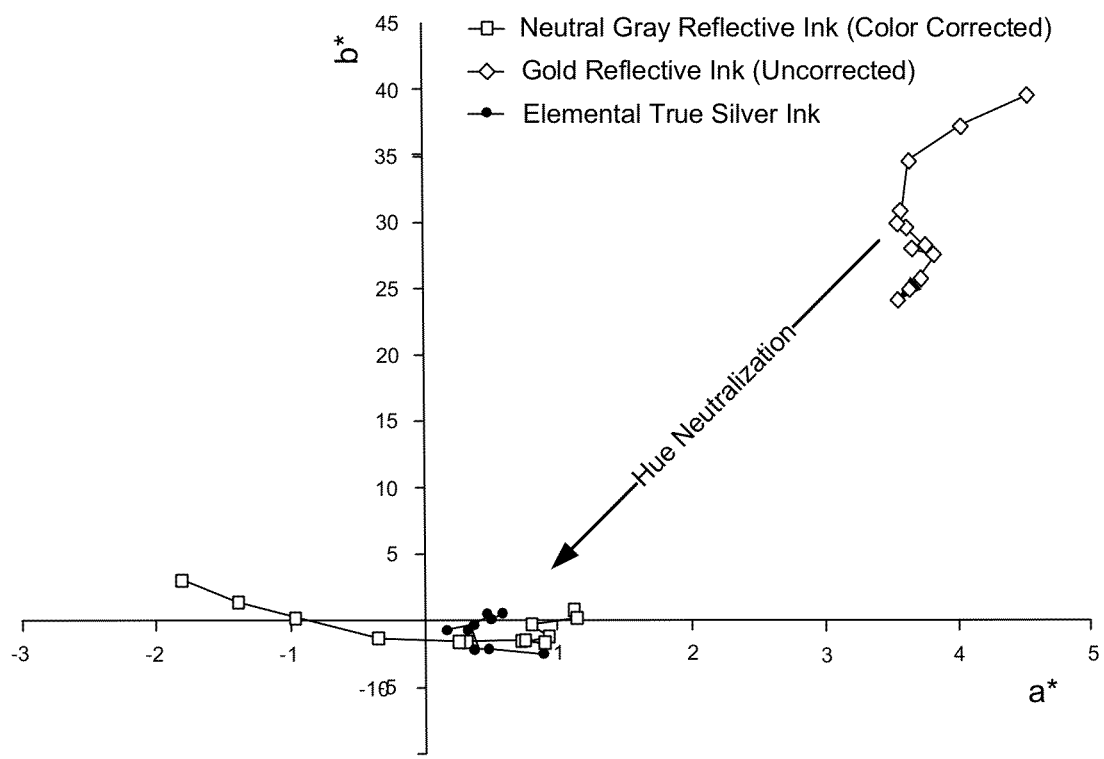
FIG. 5 is a graph depicting the hue neutralization of a gold reflective ink to a neutral gray reflective ink based on CIELAB color space.

Three inks as described above in Tables 2, 3, and 4 were each loaded into an HP Black Ink Cartridge 94 and printed from HP Photosmart 8450 printer. The print media used for this evaluation was "HP Advanced Photo Paper." Each of the three inks was printed to produce a metallic appearance. Furthermore, each of the inks was printed at various ink flux densities, ranging from about 50 pL/300$^{th}$ pixel to about 75 pL/300$^{th}$ pixel. FIG. 5 sets the measured print color of the Elemental True Silver Ink (with metallic silver nanoparticles), the Gold Reflective Ink (with magnetite particles), and the Neutral Gray Reflective Ink of the present disclosure (color corrected Gold Reflective Ink with Cyan and Magenta Dyes). As can be seen, the Neutral Gray Reflective Ink, by the addition of appropriate concentrations of Cyan and Magenta dyes, can be color corrected to obtain a*b* values that are very close to neutral, approximating the True Silver Ink that utilizes silver nanoparticles. Specifically, over the entire range of ink flux density ranging from 50 pL/300$^{th}$ pixel to 95 pL/300$^{th}$ pixel, the Neutral Gray Reflective Ink has an a* value of 2 to −3 and a b* value from 4 to −15, and more specifically in this example, the Neutral Gray Reflective Ink has an a* value of 1.5 to −2 and a b* value from 4 to −3. Furthermore, for certain specific ink fluxes, e.g., from 50 to 75 pL/300th, the Neutral Gray Reflective Ink had an a* value of 0 to 1 and a b* value from 0 to −2.

Figure 6:
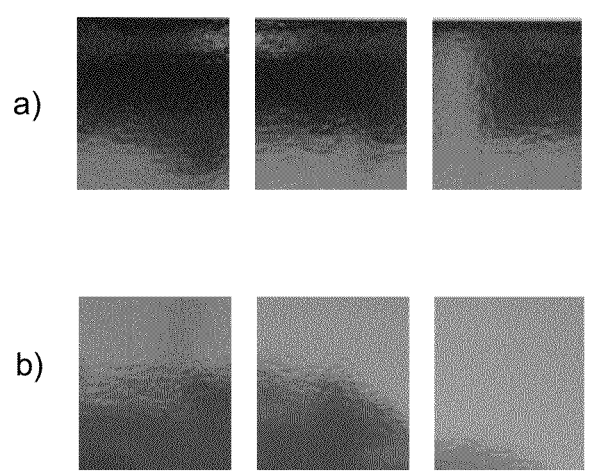
FIG. 6 provides print samples comparing the metallic sheen generated from inks that utilize elemental silver nanoparticles and the metallic sheen generated from inks of the present disclosure.

Furthermore, as shown in FIG. 6, various print samples were printed on "HP Advanced Photo Paper" at different ink densities. Row (a) depicts three printing samples printed using the Comparative True Silver Ink of Table 4 at ink densities of 71.7 pL/300$^{th}$ pixel (32%), 62.7 pL/300$^{th}$ pixel (28%), and 49.3 pL/300$^{th}$ pixel (22%), from left to right, respectively. A metallic silver sheen can be seen in these prints. Similarly, however, row (b) depicts three printing samples printed using the Neutral Gray Reflective Ink of Table 2, printed at ink densities of 71.7 pL/300$^{th}$ pixel (32%), 62.7 pL/300$^{th}$ pixel (28%), and 49.3 pL/300$^{th}$ pixel (22%), from left to right, respectively. These print samples likewise exhibited a strong metallic silver sheen, even though no metallic silver is present in the formulation.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A neutral gray reflective ink, comprising:
    an aqueous liquid vehicle;
    iron oxide reflective particles having an average particle size from 3 nm to 180 nm dispersed in the aqueous liquid vehicle; and
    a dye system solvated in the aqueous liquid vehicle,
    wherein the iron oxide particles and the dye system are present at relative concentrations to provide a reflective ink that is neutral gray, and wherein the neutral gray reflective ink provides a specular reflectivity of at least 10% when printed on a substrate.

2. The neutral gray reflective ink of claim 1, wherein the neutral gray reflective ink has an a* value of 2 to −3 and a b* value from 4 to −15 when printed on neutral white media substrate at an ink flux 50 pL/300$^{th}$ pixel to about 95 pL/300$^{th}$ pixel.

3. The neutral gray reflective ink of claim 1, formulated to have a metallic sheen when printed on a porous media substrate having an average pore size that is smaller than the average particle size of the iron oxide reflective particles, wherein the pores are also large enough in volume to receive a portion of the dye system beneath the iron oxide reflective particles, and wherein the neutral gray reflective ink has specular reflectivity of at least twice that of an unprinted surface of the porous media substrate.

4. The neutral gray reflective ink of claim 1, wherein the iron oxide particles are present at a concentration ranging from 0.1 wt % to 15 wt % based on the total weight of the neutral gray reflective ink, and all dyes of the dye system are present at a concentration ranging from 0.05 wt % to 8 wt % based on the total weight of the neutral gray reflective ink.

5. The neutral gray reflective ink of claim 1, wherein the iron oxide particles are dispersed in the neutral gray reflective ink with a polyether alkoxysilane dispersant.

6. The neutral gray reflective ink of claim 1, wherein the dye system is provided by a plurality of dyes, including at least one cyan dye and at least one magenta dye.

7. The neutral gray reflective ink of claim 1, wherein the dye system is provided by a single blue dye, or alternatively by a plurality of dyes including the blue dye.

8. A printed article with a reflective appearance, comprising:
    a porous media substrate comprising a supporting base and a porous coating layer, the porous coating having an average pore size and a pore volume; wherein the neutral gray reflective ink of claim 1 is printed on the porous media substrate such that the dye system is received by at least a portion of the pore volume; and the iron oxide particles are printed coincident with the dye system, the iron oxide particles having an average particle size that is greater than the average pore size of the porous coating, and the iron oxide particles are primarily present at an outermost surface of the porous coating.

9. The printed article of claim 8, wherein the iron oxide particles have an average size from 3 nm to 180 nm, and the average pore size of the porous coating layer is from 2 nm to 150 nm.

10. The printed article of claim 8, wherein the dye system and the iron oxide particles are delivered to the porous coating layer by a single inkjet ink comprising the dye system and the iron oxide particles.

11. The printed article of claim 8, wherein the printed article comprises iron oxide coverage in the range of 3 µg/cm² to 80 µg/cm², and wherein the reflective appearance is defined as having a specular reflectivity at least two times greater than an unprinted portion of the porous coating layer.

12. The printed article of claim 11, wherein the specular reflectivity is at least four times that of the unprinted portion of the porous coating layer.

13. The printed article of claim 8, wherein the printed articles comprises a neutral gray reflective image having an a* value of 2 to −3 and a b* value from 4 to −15.

14. A method for forming a printed article with a reflective appearance, comprising inkjet printing the neutral gray reflective ink of claim 1 on a porous media substrate.

15. The method of claim 14, wherein the porous media substrate is neutral white having an L* value of 90 to 100, and the neutral gray reflective ink has an a* value of 2 to −3 and a b* value from 4 to −15 when printed on the porous media substrate at an ink flux 50 pL/300$^{th}$ pixel to about 95 pL/300$^{th}$ pixel.

16. The neutral gray reflective ink of claim 1, wherein the neutral gray reflective ink provides a specular reflectivity of at least 15% when printed on a substrate.

17. The neutral gray reflective ink of claim 1, wherein the neutral gray reflective ink provides a specular reflectivity of at least 25% when printed on a substrate.

18. The neutral gray reflective ink of claim 1, wherein the iron oxide particles are present at a concentration from about 1 to 3 wt %, based on the total weight of the neutral gray reflective ink.

19. The method of claim 14, wherein the porous media substrate comprises:
   i) a supporting base, and
   ii) a porous coating layer having an average pore size opening and a pore volume, wherein the average pore size is smaller than the average particle size of the iron oxide reflective particles, and wherein the iron oxide reflective particles remain at least substantially at an outermost surface of the porous media substrate and at least a portion of dye system is received within pore volume.

20. The printed article of claim 8, wherein the neutral gray reflective ink is dried on the porous media substrate.

* * * * *